Dec. 2, 1930.  H. GROB  1,783,422
AUTOMOBILE SIGNAL
Filed Dec. 31, 1925
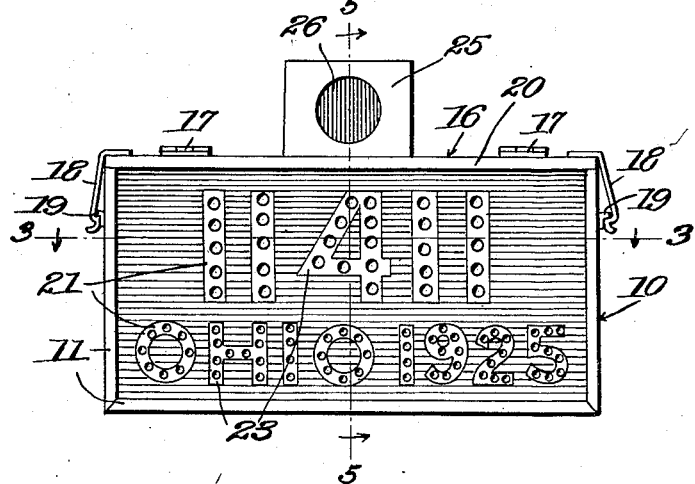
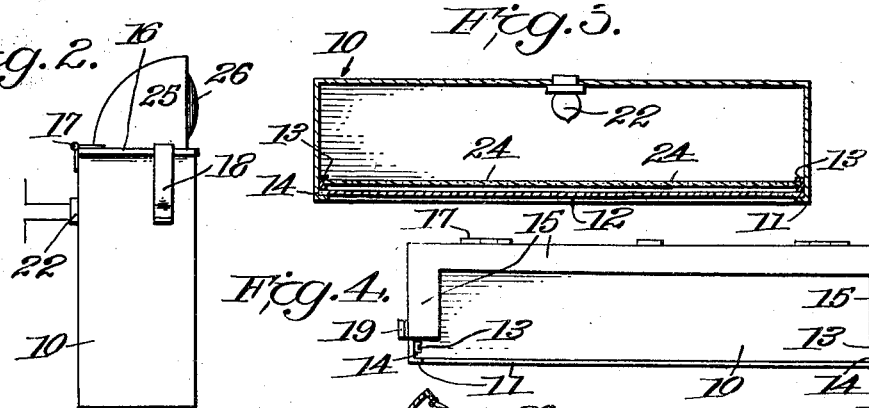
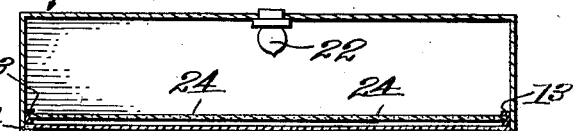
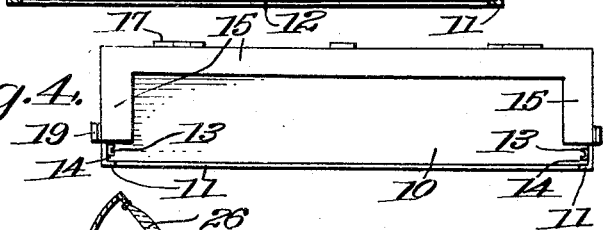
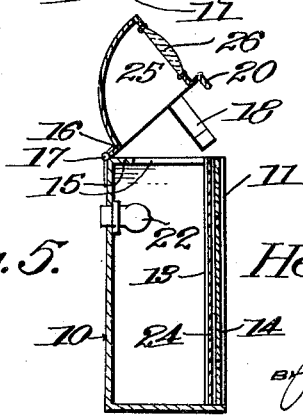
INVENTOR,
Henry Grob,
ATTORNEY.

Patented Dec. 2, 1930

1,783,422

UNITED STATES PATENT OFFICE

HENRY GROB, OF PIQUA, OHIO

AUTOMOBILE SIGNAL

Application filed December 31, 1925. Serial No. 78,602.

This invention relates to a signal box or combined illuminated license holder and tail light.

It is aimed to provide a novel and efficient construction wherein the license plate may be changed from year to year or other license period, and held in place by a movable cover carrying a tail light casing, in combination with a novel lamp box holding the cover against sagging to avoid injury to the glass used and distortion of the tail lamp casing and license tag.

Additional objects and advantages will appear from a consideration of the description following taken in connection with accompanying drawings illustrating an operative embodiment wherein:

Figure 1 is a front elevation of the signal;
Figure 2 is an end elevation thereof;
Figure 3 is a horizontal sectional view through the signal box on line 3—3 of Figure 1;
Figure 4 is a plan view of the signal box with the cover removed; and,
Figure 5 is a vertical section taken on line 5—5 of Figure 1.

Referring specifically to the drawings 10 designates a casing adapted to be carried at the rear of an automobile and formed out of sheet metal, open at the back and at the top. Inwardly extending flanges 11 on the ends and bottom wall of the casing prevent outward displacement of a removable license plate 12. Grooved strips 13 are fastened to said end walls and the plate or tag 12 is slidably applicable in grooves 14 formed between them.

At the top, relatively wide flanges 15 extend inwardly from the ends and back of casing 10 to support a cover 16 against sagging or distortion. Said cover 16 is hinged to the casing at 17 so that it may be thrown upwardly and backwardly. Spring fasteners 18 are carried by the cover and detachably engage lugs 19 on the end walls of casing 10. Cover 16 has a depending flange 20 to engage the upper edge of license plate 12.

The plate 12 is of metal with the background thereof of any suitable color having the license data thereon of a different color as at 21. At night the data is adapted to be illuminated by a lamp 22 within casing 10 and to this end, the data are perforated with numerous holes 23. A plate 24 of translucent material, usually ground glass, is disposed in the rear of the license tag to aid in giving the letters a solid appearance in daytime and a better illuminated appearance at night. Said plate 24 is slidably applicable to the grooves of strips 13.

Cover 16 has a central opening covered by a superposed tail light casing 25 having a lens or bull's-eye 26 at the rear, preferably red and being illuminated by lamp 22. The rear wall of casing 25 is a reflector and is curved to this end as shown.

The license tag 12 may be furnished by the government as usual and thus replaced from year to year.

Casing 10 is secured at the rear of the automobile with the license tag 12 and bull's-eye 26 facing the rear. In addition a similar casing is preferably used at the front of the automobile, with tail light casing 25 omitted, and with the tag 12 facing the front.

Various changes may be resorted to within the spirit and scope of the invention.

I claim:

A device of the class described comprising an illuminable signal casing having inwardly extending flanges at the top of the side and rear walls, said flanges of the side walls terminating short of the front wall, sign holders on the front walls forwardly of the flanges of said side walls, an upwardly removable sign in said sign holders, a displaceable closure resting on said flanges, an auxiliary casing rising from the closure and spaced inwardly on its sides and ends, said auxiliary casing being open at the front and having a downwardly and rearwardly curving wall, said closure being unobstructed other than by said flanges at the top so that a sign may be inserted and removed and the auxiliary casing will be illuminated from the first casing.

In testimony whereof I affix my signature.

HENRY GROB.